United States Patent
Miller

(10) Patent No.: US 7,668,231 B2
(45) Date of Patent: Feb. 23, 2010

(54) MODULAR DATA DEVICE

(75) Inventor: Bruce Michael Miller, Coquitlam (CA)

(73) Assignee: Sierra Wireless, Inc., Richmond, BC (CA)

( * ) Notice: Subject to any disclaimer, the term of this patent is extended or adjusted under 35 U.S.C. 154(b) by 666 days.

(21) Appl. No.: 11/181,179

(22) Filed: Jul. 13, 2005

(65) Prior Publication Data

US 2005/0250535 A1    Nov. 10, 2005

Related U.S. Application Data

(62) Division of application No. 09/934,881, filed on Aug. 22, 2001, now abandoned.

(51) Int. Cl.
*H04B 1/38* (2006.01)
*H04L 5/16* (2006.01)

(52) U.S. Cl. .................. 375/222; 375/219; 375/220; 375/257; 455/556.1; 455/418; 455/419; 455/558

(58) Field of Classification Search .............. 375/219, 375/220, 222, 257; 455/556.1, 418, 419, 455/558
See application file for complete search history.

(56) References Cited

U.S. PATENT DOCUMENTS

| 5,701,515 | A | 12/1997 | Gradeler |
| 6,243,578 | B1 | 6/2001 | Koike |
| 6,259,929 | B1 | 7/2001 | Kuisma ................... 455/550 |
| 7,194,285 | B2 * | 3/2007 | Tom ..................... 455/556.1 |

FOREIGN PATENT DOCUMENTS

| DE | 199 48 022 A1 | 4/2001 |
| EP | 0 670 637 A2 | 3/1995 |
| EP | 0 680 155 A1 | 11/1995 |
| EP | 0 887 987 A2 | 12/1998 |
| EP | 1104976 A1 | 6/2001 |
| GB | 2292653 A | 2/1996 |
| JP | 8-79344 | 3/1996 |
| JP | 11017790 A | 1/1999 |
| JP | 2001-69260 | 3/2001 |
| WO | WO 95/34958 | 12/1995 |
| WO | WO 95/34958 A1 | 12/1995 |
| WO | WO 99/22538 | 5/1999 |

OTHER PUBLICATIONS

International Search Report; International Application No. PCT/CA02/01291; Filed Aug. 20, 2002; 4 pages.
Lin Xiang, Examiner; "Notification of the First Office Action" related to Application No. 02816428, ROC; mailed Nov. 25, 2005; 2 pgs.

* cited by examiner

*Primary Examiner*—Phuong Phu
(74) *Attorney, Agent, or Firm*—Nixon Peabody LLP

(57) ABSTRACT

The system includes a modem unit with a standardized form factor and standardized connector. The modem unit can be connected to a phone shell personal digital assistant and for other data units. Connected to the phone shell, the modem unit transmits voice data. Connected to the personal digital assistant or other data device, the modem unit transfers data. By having a modem unit that can usable both for voice and data, a single cellular transceiver can be used for both voice and data without requiring a wired connector. Additionally the standardized form factor and connector allows a second modem unit, having a second type of cellular connection, to be used in place of the first modem unit. The other type of cellular connection can be a different communication standard.

8 Claims, 5 Drawing Sheets

Example Cell Phone
Interface Implementation

Example Laptop Interface Implementation

MODULAR DATA DEVICE

CROSS-REFERENCE TO RELATED APPLICATION

This application is a divisional of U.S. patent application Ser. No. 09/934,881, entitled "MODULAR DATA DEVICE" by inventor Bruce Michael Mille, filed on Aug. 22, 2001 now abandoned.

BACKGROUND OF THE INVENTION

Many systems use cellular networks to communicate. These include cellular phones, personal digital assistants (PDA's) and portable computers using cellular modems. Currently, cellular transceivers tend to be relatively expensive. A person who has a PDA unit for data transmission with a cellular transceiver can also have a cell phone with its own cellular transceiver for voice transmissions. This can be unnecessarily expensive because the user is required to buy two transceiver units.

One way to try to avoid this is to use cables to interconnect a cell phone to a PDA or personal computer to transmit data. Although such systems are operative, they tend to be very bulky and unwieldy because of the wire adapter between the cell phone and the data device.

It is desired to have a new way of sharing a cellular transceiver between voice and data units.

SUMMARY OF THE INVENTION

The present invention uses a modem type of a consistent form factor having a standardized connector for use with both voice and data units. The modem unit is connectable to a phone shell unit. The phone shell unit includes a speaker and microphone and a standardized connector. The phone shell unit does not have a cellular transceiver but is adapted to be connected to a modem unit with a cellular transceiver. The modem unit is removable from the phone shell and adapted to be connected to another unit for data transfer. This other unit can be a personal digital assistant (PDA), a personal computer, or any other data transmitter unit.

In another embodiment of the present invention, the phone shell unit and other units are connectable to a modem units of multiple types able to produce different types of connections to cellular networks. Thus, in one embodiment, a first type of modem unit is used for U.S. standard Cable Division Multiple Access (CDMA) transmissions, and another type of modem unit is used for a European standard or for Time Division Multiple Access (TDMA) transmissions. The modem units have a predetermined and standardized form factor and have standardized connectors to allow them to be connected to the phone shell and other units in a standardized fashion.

BRIEF DESCRIPTION OF THE DRAWING FIGURES

DETAILED DESCRIPTION OF THE INVENTION

Figure 1:
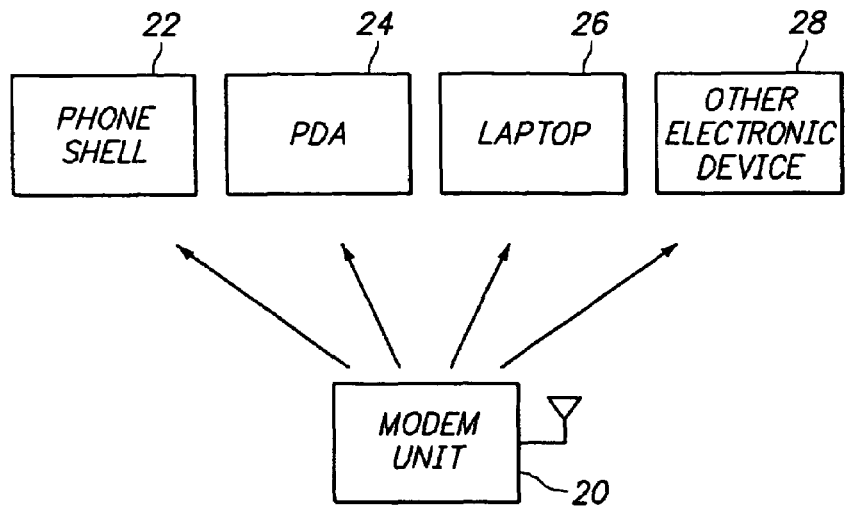
FIG. 1 is a diagram illustrating a modem unit which is connectable to a number of different other elements.

FIG. 1 illustrates a modem unit 20 which is produced having a standardized form factor and a standardized connector. The modem unit 20 is connectable to a number of different devices, including voice devices, such as the phone shell 22, and data devices, such as the PDA 24 and the laptop 26. The modem unit 20 can potentially also be connected to another unspecified electronic device 28.

The modem unit 20 can thus be connected to a phone shell when the user wants to make telephone connections across a cellular network. When the user wants, instead, to transmit data from a PDA or from a laptop, the modem unit 20 can be removed from the phone shell 22 and inserted into the PDA 24 or laptop 26 as required. Thus, only one modem unit 20 with a cellular transceiver need be used. By having a standardized form factor and standardized connector for the modem unit 20, a wire adapter is not needed to transmit data. The network credentials (phone number, billing information, etc.) follow the modem module. Therefore, one account can be used for multiple applications.

Figure 2A:
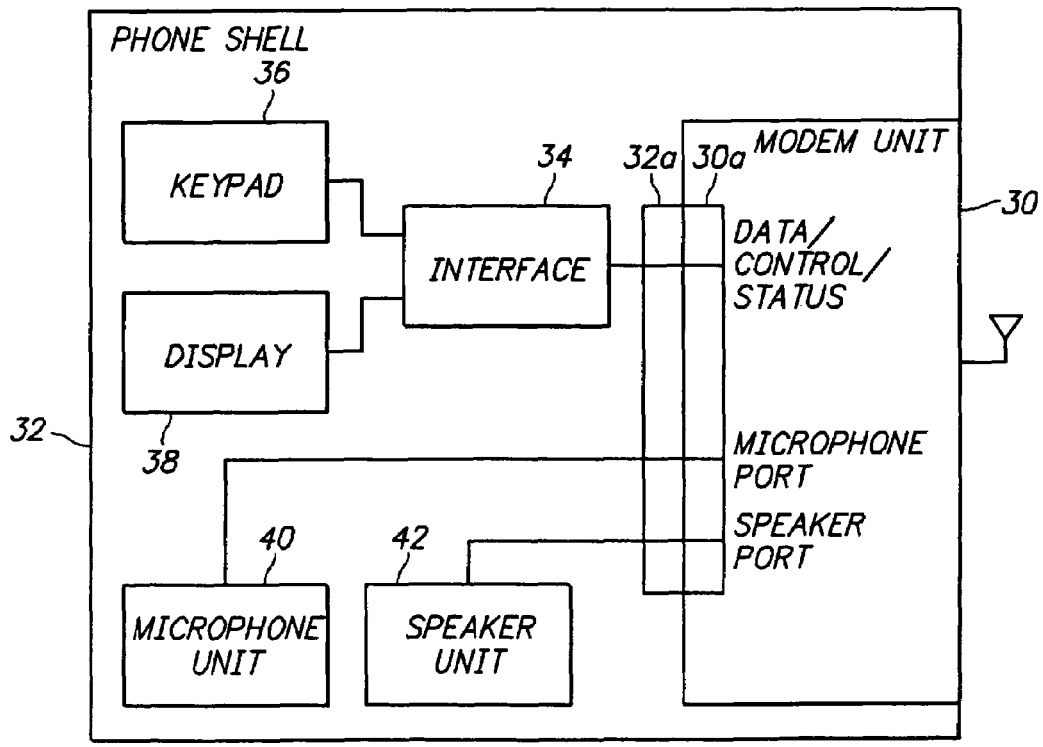
FIG. 2A illustrates a phone shell connected to a modem unit.
Figure 2B:
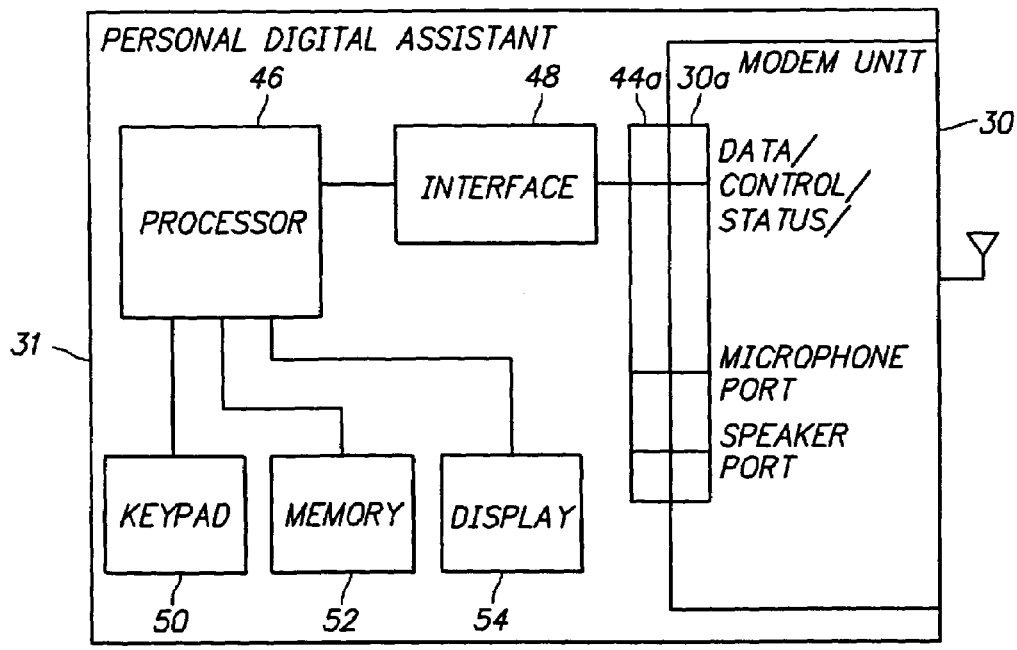
FIG. 2B illustrates a personal digital assistant connected to the modem unit.
Figure 2C:
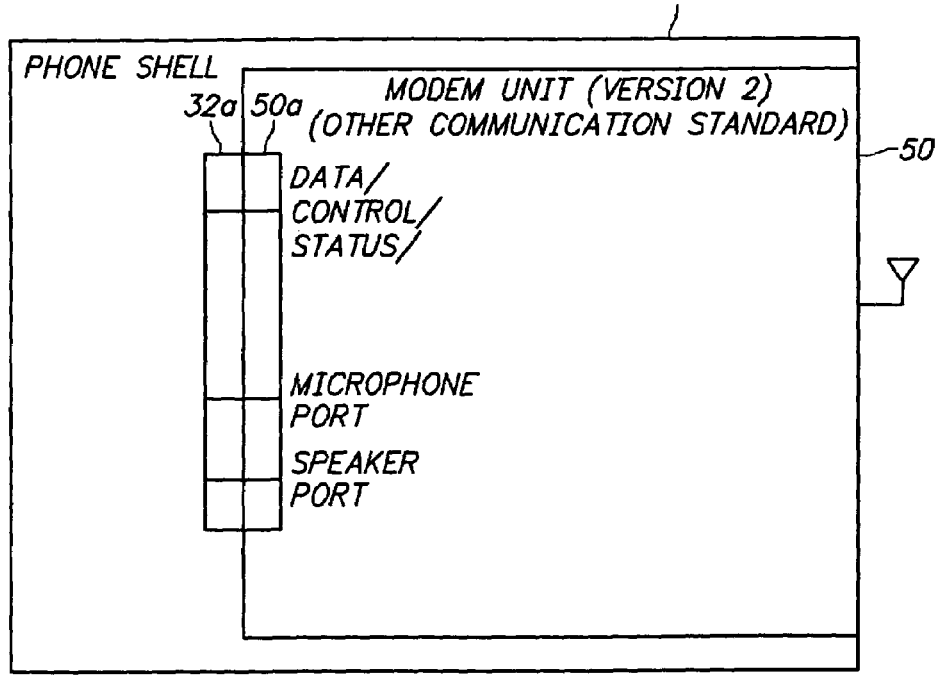
FIG. 2C illustrates a phone shell unit connected to another version of the modem unit.

FIGS. 2A-2C illustrate examples of the system of the present invention. FIG. 2A illustrates a modem unit 30 connected to a phone shell 32. The modem unit has a connector 30a, which connects to a matching connector 32a at the phone shell 32. The standardized connectors 30a and 32a include connections for data control status, a microphone port and a speaker port that allows for both data and voice type communications. Phone shell 32 preferably includes an interface 34, which allows a keypad 36 and display 38. The microphone unit 40 and speaker unit 42 are connected to this microphone port and speaker port, respectively, of the modem unit. Thus, the phone shell 32 can be constructed quite cheaply with inexpensive parts. The modem unit 30 contains the expensive cellular transceiver elements.

FIG. 2B illustrates the modem unit 30 removed from the phone shell 32 and placed within a personal digital assistant 44. The personal digital assistant 44 includes a processor 46, interface 48, keypad 50, memory 52 and display 54. Data is transmitted on the data control status line to the modem unit which allows for the transmission of data by the modem unit. The connector 30a of the modem unit 30 connects to the matching connector 44a of the personal digital system. By having a standardized connector for both the phone shell and for the data unit, such as the personal digital system, the system of the present invention gains much flexibility.

FIG. 2C illustrates the case in which the phone shell 32 is connected to another modem unit 50. This modem unit 50 uses a different communication standard from the modem unit 30. Note that the connector 50a at modem unit 50 connects to the matching connector 32a on the phone shell 32. Thus, since standardized form factor and connector are used for the modem units and the data and voice units, a different modem unit can be used for the phone shell. Thus, the phone shell 32 can be quickly switched for different communication standards, such as the switch between communication standards used in the U.S. and the communication standard used in Europe. Examples of different communication standards include the cellular code division multiple access (CDMA), time division multiple access (TDMA) and the like.

Figure 3:
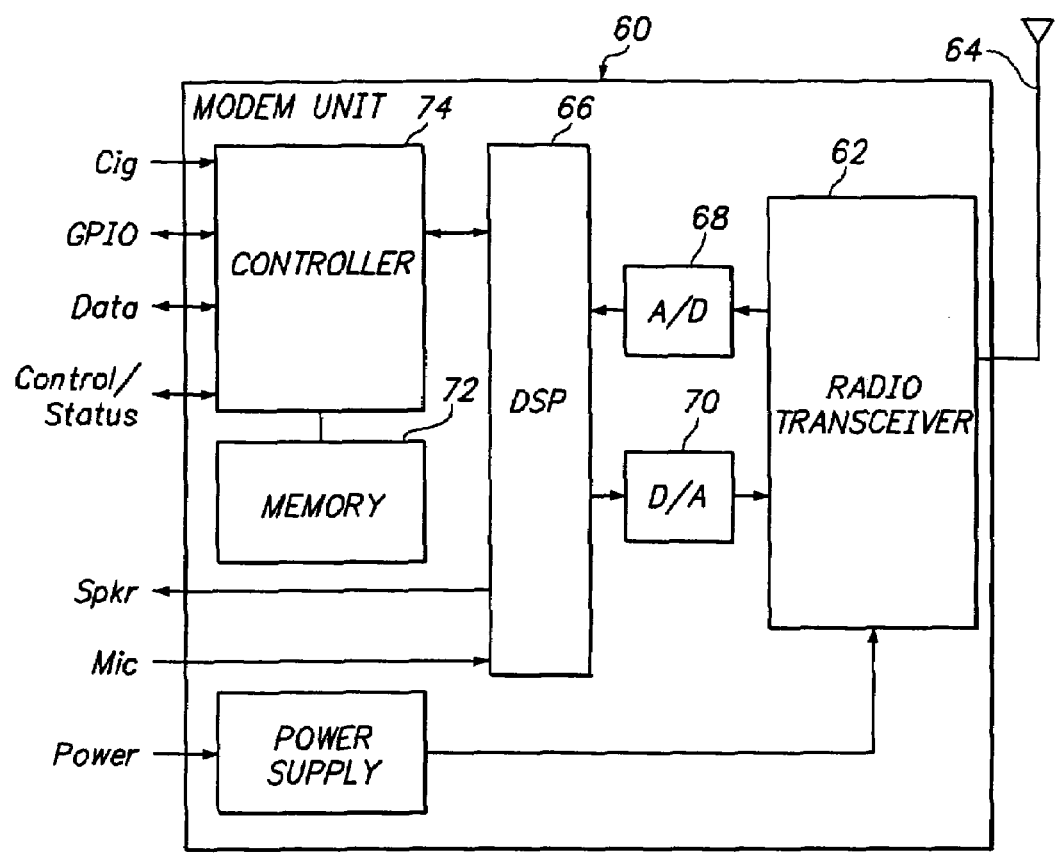
FIG. 3 illustrates one example of a modem unit for use with the system of the present invention.

FIG. 3 illustrates an example of a modem unit 60 in one embodiment of the present invention. The modem unit 60 includes the cellular radio transceiver 62. The modem unit 60 also includes an antenna 64, a Digital Signal Processor (DSP) 66, an A/D convertor 68 and a D/A convertor 70. The modem unit 60 also can include a memory 72. Also shown is a controller 74 for the control data status line.

Figure 4A:
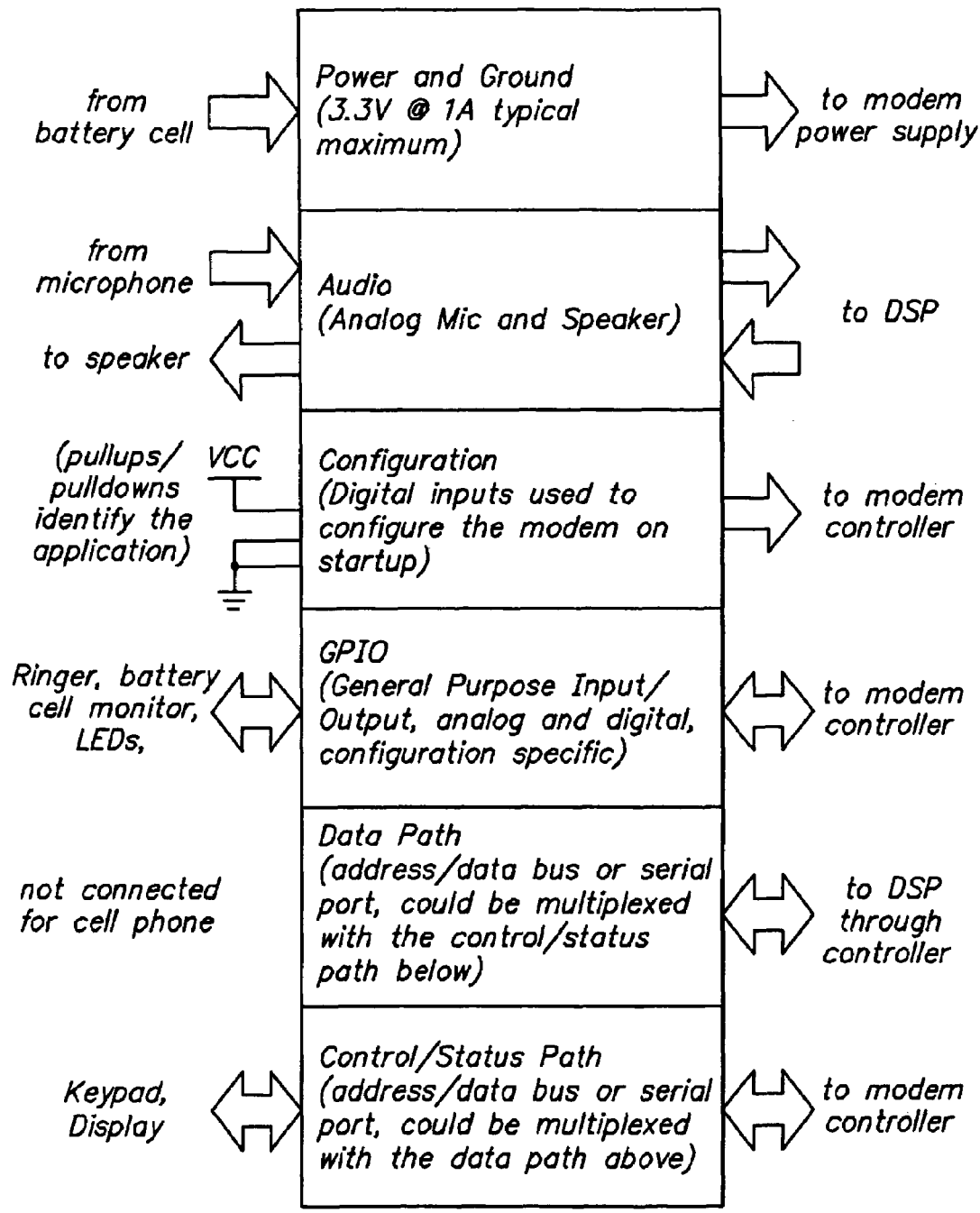
FIGS. 4A and 4B are block diagrams that illustrate examples of interfaces for one embodiment of the present invention.
Figure 4B:
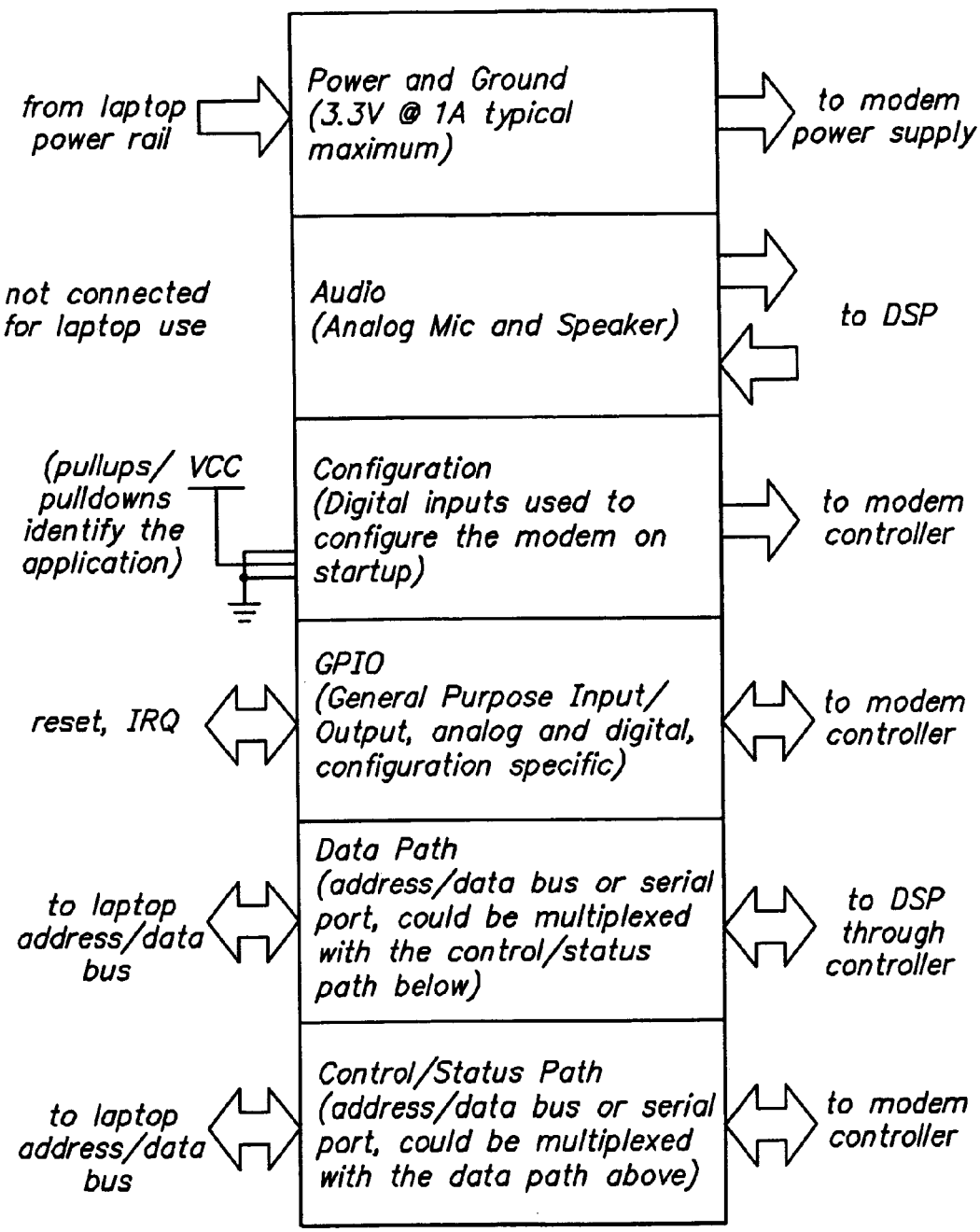

FIG. 4A is a block diagram that illustrates an example of a cell phone interface. FIG. 4B is a block diagram of a laptop interface. These block diagrams are intended to be illustrative and not exhaustive. In a preferred embodiment, the connections to the left are application specific, and the connections to the right are internal to the modem and are consistent from application to application and from network to network.

In a preferred embodiment, a number of inputs to the modem are intended to be pulled to logic high or low to identify the application for the modem. When the modem powers on, it polls those bits to find out if it is plugged into a cell phone, a PDA, a laptop, a mobile device or something else. For example, in a cell phone application, the modem is the master controller and must control all the peripherals. In contrast, in a laptop application, the modem is a slave to the laptop's processor (host) and simply responds to the host's commands.

It will be appreciated by those of ordinary skill in the art that the invention can be implemented in other specific forms without departing from the spirit or character thereof. For example, in addition to freestanding cell phones, mobile phone applications with automobile mounts can also be used. The presently disclosed embodiments are therefore considered in all respects to be illustrative and not restrictive. The scope of the invention is illustrated by the appended claims rather than the foregoing description, and all changes that come within the meaning and range of equivalents thereof are intended to be embraced herein.

What is claimed is:

1. A system comprising:
    a modem unit of a first type having a predetermined form factor, the modem unit having a standardized connector and adapted to provide a first type of connection to a cellular network; and
    a phone shell unit connectable to the modem unit and including a speaker and a microphone, the modem unit connectable to the phone shell unit using a standardized connector, the phone shell unit not having a cellular transceiver but adapted to use a cellular transceiver in the modem unit; wherein the modem unit is removable from the phone shell and is connectable to another unit, and the phone shell unit is connectable to a modem unit of a second type to provide a second type of cellular connection, and wherein the modem unit is configured to operate as a master controller when connected to one of the phone shell unit or the another unit, and as a slave device when connected to the other of the phone shell unit or the another unit.

2. The system of claim 1 wherein the connection of the modem unit to the another unit is for data transfer.

3. The system of claim 2 wherein the another unit is a personal digital assistant.

4. The system of claim 2 wherein the another unit is a personal computer.

5. The system of claim 1 wherein the first type of cellular connection is a U.S. standard cellular connection and the second type of cellular connection is a European standard cellular connection.

6. The system of claim 1 wherein the first type of cellular connection is a CDMA cellular connection.

7. The system of claim 1 wherein the phone shell includes a keypad and display.

8. The system of claim 1 wherein the connectors have standardized connectors for voice and data.

* * * * *